United States Patent [19]

Koshiishi et al.

[11] Patent Number: 5,120,490
[45] Date of Patent: Jun. 9, 1992

[54] LIQUID FILLING METHOD FOR A HIGH-TEMPERATURE AND HIGH-PRESSURE VESSEL AND APPARATUS THEREFOR

[75] Inventors: Masato Koshiishi; Shouichirou Kinoshita; Minoru Akita, all of Hitachi; Isao Sumida, Ibaraki, all of Japan

[73] Assignee: Hitachi, Ltd., Tokyo, Japan

[21] Appl. No.: 409,120

[22] Filed: Sep. 19, 1989

[30] Foreign Application Priority Data

Sep. 21, 1988 [JP] Japan .................. 63-235028

[51] Int. Cl.⁵ ............................................. G21C 15/00
[52] U.S. Cl. ........................... 376/282; 376/283; 376/299
[58] Field of Search ............ 376/282, 283, 293, 298, 376/299

[56] References Cited

U.S. PATENT DOCUMENTS

| | | | |
|---|---|---|---|
| 3,180,802 | 4/1965 | West et al. | 376/283 |
| 4,595,555 | 6/1986 | Orii | 376/283 |
| 4,753,771 | 6/1988 | Conway et al. | 376/283 |

FOREIGN PATENT DOCUMENTS

| | | | |
|---|---|---|---|
| 69289 | 4/1982 | Japan . | |
| 235092 | 11/1985 | Japan . | |
| 259995 | 12/1985 | Japan . | |
| 170866 | 7/1987 | Japan . | |
| 182697 | 8/1987 | Japan | 376/283 |
| 212594 | 9/1987 | Japan . | |
| 75594 | 4/1988 | Japan | 376/283 |
| 212892 | 9/1988 | Japan | 376/283 |

*Primary Examiner*—Daniel D. Wasil
*Attorney, Agent, or Firm*—Antonelli, Terry, Stout & Kraus

[57] ABSTRACT

Disclosed is a liquid filling apparatus for high-temperature and high-pressure vessel. The apparatus comprises a high-temperature and high-pressure vessel, a closed liquid storage tank disposed at a level higher than that at which liquid is filled into the high-temperature and high-pressure vessel, a liquid-filling flow passage for supplying liquid from the closed liquid storage tank into the high-temperature and high-pressure vessel, a pressure-feed flow passage for supplying pressure from the high-temperature and high-pressure vessel to the closed liquid storage tank, valves equipped on the liquid-filling flow passage and the pressure-feed flow passage respectively, and a liquid-filling liquid source adapted to communicate with the interior of the closed liquid storage tank via a valve, whereby the environmental surroundings of the closed liquid storage tank are lower in temperature than the interior of the high-temperature and high-pressure vessel.

20 Claims, 5 Drawing Sheets

LIQUID FILLING METHOD FOR A HIGH-TEMPERATURE AND HIGH-PRESSURE VESSEL AND APPARATUS THEREFOR

BACKGROUND OF THE INVENTION

The present invention relates to a method of filling liquid into a high-temperature and high-pressure vessel and to an apparatus therefor, said method and said apparatus being used, for example, to fill a liquid into a reactor or a steam generator which causes generation of a high-temperature and high-pressure steam.

Conventionally, an emergency cooling apparatus for reactor core which is based on the use of a static means includes, as a first prior art, one which is disclosed in Japanese Patent Unexamined Publication No. 60-235092. In the emergency cooling apparatus disclosed in this document at the time when a loss-of-coolant accident has taken place due to, for example, breakage of reactor pipings, the pressure within a water storage tank disposed at a level higher than that corresponding to a pressure vessel of the reactor is equalized with the pressure within the latter. The coolant within the water storage tank is thereby supplied into the pressure vessel by the action of the gravitational force.

More specifically, a first piping having a first valve at a midway thereof connects a top section of the reactor pressure vessel and a top section of the water storage tank. A second piping having a second valve at a midway thereof connects a bottom of the water storage tank and the reactor pressure vessel. A differential pressure gage is provided on a piping communicating an upper section of the reactor pressure vessel with an upper section of the water storage tank. Where a loss-of-coolant accident has occurred, the first valve is opened. As a result, the steam generated within the pressure vessel is led to a position above the water surface of the water storage tank by way of the first piping. Thus, the pressures within the pressure vessel and within the water storage tank are equalized with each other while both are being monitored by the differential pressure gage. Thereafter, the second valve is opened. In consequence, the water within the water storage tank is filled into the pressure vessel by utilizing the gravitational force. This type of liquid filling apparatus is disclosed in Japanese Patent Unexamined Publications Nos. 57-69289, 62-212594 and 60-259995.

A second prior art is disclosed in Japanese Patent Unexamined Publication No. 62-170886. In this Publication, a reactor container is provided in a state wherein it stores a pressure vessel therein and another upper reactor container is added thereto at a position higher than that corresponding to said pressure vessel. At the time when a loss-of-coolant accident has taken place, the suppression pool water within the pressure vessel of the lower reactor container is pressure fed to the upper reactor container by utilizing the increased pressure within the pressure vessel. The suppression pool water is stored in the upper reactor container as a coolant. Thereafter, a spray system within the lower reactor container is caused to operate so as to condense the steam within the same. During this spraying operation, the pressure within the lower reactor container is decreased. Thereafter, the coolant as above stored is filled from the upper reactor container into the lower one by the gravitational force. By repetition of this operation, the reactor core within the pressure vessel of the lower reactor container is cooled. When the coolant within the upper reactor container is exhausted, a rise in pressure within the reactor container is waited while, for example, the operation of the spray system is kept stopped. Thereafter, the suppression pool water within the reactor container is pressure fed again to the upper reactor container. The reactor core within the pressure vessel of the lower reactor container is cooled through repetition of the above operation.

According to the first prior art, upon completion of filling into the pressure vessel the amount of the coolant as stored in the water storage tank, any further filling of coolant becomes impossible. Accordingly, the first prior art is unsuitable for a long period filling of coolant.

According to the second prior art, the pressure within the pressure vessel of the reactor is forcedly decreased by operation of the spray system and, only when that pressure has been decreased, the coolant as stored in the upper reactor container is filled into the pressure vessel of the reactor by the action of the gravitational force. For this reason, a large amount of time is required until the filling of the coolant into the pressure vessel is started. In addition, it is premised that the operation of the spray system is secured, so that the coolant filling must rely upon the normality of movable section such as a pump motor for the spray system. Accordingly, not a static means but a dynamic means is inevitably employed in substance.

Furthermore, where the pressure equalizing means of the first prior art is adopted in the second prior art, the coolant can be expected to be more speedily filled into the pressure vessel. However, only the use of the pressure within the suppression pool within the lower reactor container fails, from the standpoint of pressure balance, to cause the pool water to be fed to the interior of the upper reactor container, whose pressure has been increased by the pressure equalizing means, and thus stored again in the same. Re-filling of coolant, therefore, is not smoothly effected.

SUMMARY OF THE INVENTION

Accordingly, a first object of the present invention is to provide a liquid filling apparatus which is capable of repeatedly filling a liquid into a high-temperature and high-pressure vessel without employing any dynamic equipment or appliance.

A second object of the present invention is to provide a liquid storage tank which is suitable for use in repeatedly filling liquid into a high-temperature and high-pressure vessel without using any dynamic equipment.

A third object of the present invention is to secure safety, for a long period of time and without using any dynamic equipment, at the time of a loss-of-coolant accident on a steam generator in the case where the same is constituted by a high-temperature and high-pressure vessel.

A fourth object of the present invention is to secure safety, for a long period of time and without using any dynamic equipment, at the time of a loss-of-coolant accident on a pressure vessel of a reactor in the case where the same is constituted by a high-temperature and high-pressure vessel.

A fifth object of the present invention is to provide a liquid filling method which is capable of repeatedly filling a liquid into a high-temperature and high-pressure vessel without employing and dynamic equipment.

To attain the above object, according to one aspect of the present invention, there is provided a liquid filling apparatus for high-temperature and high-pressure vessel, which comprises a high-temperature and high-pressure vessel, a closed liquid storage tank disposed at a level higher than that at which liquid is filled into the high-temperature and high-pressure vessel, a liquid filling flow passage through which liquid is filled from the closed liquid storage tank into the high-temperature and high-pressure vessel, a pressure supplying flow passage through which pressure is supplied from the high-temperature and high-pressure vessel into the closed liquid storage tank, valves provided on the liquid filling flow passage and the pressure-supplying flow passage respectively, and a liquid source for the filling of the liquid, the liquid source being allowed to communicate with the interior of the closed liquid storage tank via a valve, whereby the environmental surroundings of the closed liquid storage tank are lower in temperature than the interior of the high-temperature and high-pressure vessel.

To attain the above object, according to another aspect of the present invention, there is provided a liquid filling apparatus for high-temperature and high-pressure vessel, which comprises a looped flow passage composed of the interior of a high-temperature and high-pressure vessel, the interior of a closed liquid storage tank disposed at a level higher than that at which liquid is led to the high-temperature and high-pressure vessel, and a plurality of flow passages for allowing the communication between the interior of the high-temperature and high-pressure vessel and the interior of the closed liquid storage tank, a valve provided on each of said plurality of flow passages, and a liquid source for the filling of the liquid, the liquid source being allowed to communicate with the interior of the closed liquid storage tank via a valve, whereby the environmental surroundings of the closed liquid storage tank are lower in temperature than the interior of the high-temperature and high-pressure vessel.

To attain the above object, according to still another aspect of the present invention, there is provided a closed liquid storage tank for filling of liquid which comprises a liquid inlet allowed to communicate with a liquid source via a check valve for checking the flow of the liquid from the liquid storage tank toward the liquid source, a pressure inlet through which the pressure from the high-temperature and high-pressure vessel is introduced into the liquid storage tank via a valve, and a liquid supply port for supplying liquid of the liquid source into the high-temperature and high-pressure vessel via a valve.

To attain the above object, according to a further aspect of the present invention, there is provided a liquid filling method comprising the steps of causing the pressure within the high-temperature and high-pressure vessel and the pressure within the closed liquid storage tank to vary in level so as to make both the pressure equal to each other and then filling liquid from the closed liquid storage tank into the high-temperature and high-pressure vessel by the action of the gravitational force, the liquid filling method further comprising the step of rendering ineffective the communication between the interior of the high-temperature and high-pressure vessel and the interior of the closed liquid storage tank in advance of the filling of liquid and the step of performing the dissipation of the heat within the closed liquid storage tank to the outside thereof to cause a decrease in level of the pressure therewithin and causing a liquid of the liquid source to be sucked therein to thereby cause the liquid to be stored therein.

According to the present invention, when the valve provided on the pressure-supplying flow passage is opened, the pressure within the high-temperature and high-pressure vessel becomes substantially equal in level to that within the closed liquid storage tank. In this state, when the valve provided on the liquid-feeding flow passage is opened, the liquid stored within the liquid storage tank is passed therethrough by the gravitational force to be introduced into the high-temperature and high-pressure vessel. Thereafter, when the valves on both the flow passages are closed, the liquid storage tank is cooled by the environmental surroundings, so that the interior thereof comes to have a pressure level relatively lower than that of the liquid source. Consequently, liquid enters the closed liquid storage tank by way of another valve. Thereafter, when the valves are opened in a state wherein reverse flow toward the liquid source is checked by said another valve, re-introduction of liquid from the closed liquid storage tank into the high-temperature and high-pressure vessel, based on the utilization of the gravitational force, is carried out. Through repetition of this operation, a long period liquid introduction action is realized without employing any dynamic equipment.

According to the present invention, when the respective valves of the flow passages are opened, the looped flow passages comes into a condition wherein the liquid is allowed to circulate therethrough. Consequently, the pressure difference between the interior of the high-temperature and high-pressure vessel and that of the closed liquid storage tank comes to be substantially zero. For this reason, liquid is allowed to flow by the gravitational force from the closed liquid storage tank at a higher location to the high-temperature and high-pressure vessel at a lower location. When the liquid stored in the closed liquid storage tank has been exhausted, the respective valves of the flow passages are closed so as to permit the residual high temperature atmosphere within the closed liquid storage tank to be cooled by the atmosphere prevailing outside the tank, thus causing the pressure within the closed liquid storage tank to become relatively lower in level than the pressure within the liquid source, thus causing the liquid of the liquid source to be sucked into the closed liquid storage tank via said another valve, thus causing that liquid to be stored into the same. Thereafter, when the respective valves of the flow passages are opened and the flow of the liquid toward the liquid source is checked by said another valve, re-introduction into the high-temperature and high-pressure vessel is started. Through the repeated performance of this operation, a long-period introduction of liquid can be realized with no use of any dynamic equipment.

According to the present invention, the closed liquid storage tank for filling of liquid receives the pressure from the high-temperature and high-pressure vessel, so that the internal pressure thereof balances with that of the high-temperature and high-pressure vessel. Consequently, the liquid stored in the closed liquid storage tank becomes easy to enter the high-temperature and high-pressure vessel. On the other hand, when the communication between the liquid storage tank and the high-temperature and high-pressure vessel has been rendered ineffective, the pressure within the liquid storage tank can be easily decreased in level merely by cooling the closed liquid storage tank and without receiving any effect produced by the pressure and temperature of the high-temperature and high-pressure vessel. This makes it easy for the liquid of the liquid source to enter the closed liquid storage tank, thus enabling the performance of the action of causing liquid to be stored again into the closed liquid storage tank.

According to the present invention, the closed liquid storage tank is allowed to communicate with the high-temperature and high-pressure vessel so as to make a change in level of the pressures thereof and thereby make them equal to each other. Then, the liquid within the closed liquid storage tank can be fed therefrom into the high-temperature and high-pressure vessel by the action of the gravity. Upon completion of such feeding of liquid, the communication between the high-temperature and high-pressure vessel and the closed liquid storage tank is rendered ineffective. Thus, the heat prevailing within the closed liquid storage tank is dissipated to the outside thereof so as to make the pressure within the tank lower in level than that of the liquid source. Thus, the liquid from the liquid source is sucked into the tank and thus is stored therein. Thereafter, the communication between the high-temperature and high-pressure vessel and the closed liquid storage tank is rendered effective, thus re-opening the introduction of liquid into the vessel.

DESCRIPTION OF THE PREFERRED EMBODIMENTS

Embodiments of the present invention will now be described with reference to FIGS. 1 to 8.

Figure 1:
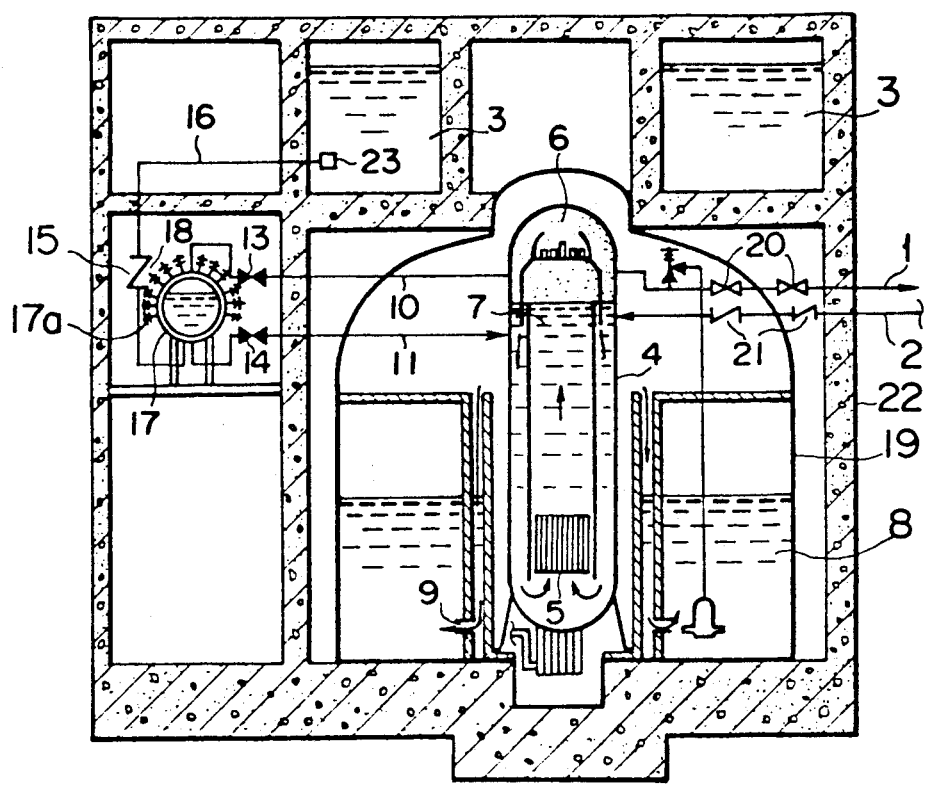
FIG. 1 is a vertical sectional view of a reactor in accordance with a first embodiment of the present invention.

A first embodiment shown in FIG. 1 is as follows.

A cooling water type reactor includes a pressure vessel 4 which contains therein a reactor core 5 capable of generating heat by nuclear reaction and a cooling water 7 serving as a coolant. The pressure vessel 4 is stored in a primary reactor container 19 made of steel together with a suppression pool 8. This primary reactor container 19 is stored in a secondary reactor container 22 made of concrete.

Within the secondary reactor container 22, a fuel storage pool 3, a water storage tank 17, etc. are installed. A main steam piping 1 is connected to the pressure vessel 4 so as to send the high-temperature and high-pressure steam 6 produced in an upper phase section within the pressure vessel 4 to a turbine side via a main steam isolation valve 20. A water-feed piping 2 is connected to the pressure vessel 4 so as to communicate with the cooling water 7 therewithin, thus enabling a condensate from a condenser or the like to be supplied into the pressure vessel 4 via a check valve 21. A gas phase section of the water storage tank 17 and a steam phase section of the pressure vessel 4 are allowed to communicate with each other by means of a piping 10. An on-off valve 13 is provided on the piping 10 at a midway thereof. A liquid phase section of the water storage tank 17 is allowed to communicate with a liquid phase section of the pressure vessel 4 via a piping 11, on which an on-off valve 14 is provided. The interior of the water storage tank 17 is communicated with the pool water within the fuel storage pool 3 by means of a piping 16 which is equipped, at a midway thereof, with a check valve 15 permitting only the flow of water toward the interior of the water storage tank 17. The water storage tank 17 is provided, at its outer peripheral surface, with pin-type fins 17a serving as a heat dissipation means.

In the first embodiment having the described construction, usually, the on-off valves 13, 14 are closed and the main steam isolation valve 20 is opened. When the reactor is operated under this condition, the cooling water 7 heated by the reactor core 5 is circulated within the pressure vessel 4 as indicated by the arrows to produce a high-temperature and high-pressure steam in the steam phase section of the pressure vessel 4. This steam is sent to a turbine by way of the main steam piping 1 and thus is utilized as a drive source for such turbine. The steam thus utilized is changed into a condensate and is passed through the water feed piping 2 and thus returned back to the liquid phase section of the pressure vessel 4. When the pressure vessel 4 or main steam piping 1 is broken and resultantly the cooling water 7 within the pressure vessel 4 is released, as it stands or in the changed form into a steam, into the primary reactor container 19, the coolant 7 within the pressure vessel decreases to cause the occurrence of a loss-of-coolant accident. When such loss-of-coolant accident has taken place, the high-temperature and high-pressure steam having been released from the pressure vessel, main steam piping, or the like into the primary reactor container 19 is led into the pool water of the suppression pool 8 via a vent port 9. Thus, such steam is condensed to cause a decrease in level of the pressure within the primary reactor container 19. This eliminates the occurrence of a danger attributable to the increased pressure.

When the loss-of-coolant accident has taken place, the on-off valve 13, 14 are simultaneously opened, or firstly the on-off valve 13 and secondly the on-off valve 14 are opened to permit communication between the pressure vessel 4 and the water storage tank 17. In this state, the high-temperature and high-pressure steam is introduced from the pressure vessel into the water storage tank 17, whereby the pressure within the pressure vessel 4 becomes equal in level to that within the water storage tank 17. Since the cooling water 7 within the pressure vessel 4 becomes lower in level than the liquid surface within the water storage tank 17, the cooling water stored in the water storage tank 17 is introduced into the pressure vessel 4 by way of the piping 11 and by the action of the gravitational force.

When the stored water in the water storage tank 17 becomes empty and introduction of water is further needed, the on-off valves 13, 14 are closed to cut off the influence of high-temperature and high-pressure from the pressure vessel 4 to the water storage tank 17. Thereafter, the water storage tank 17 is cooled by its surroundings. This cooling is effected with high efficiency by dissipating the heat within the water storage tank 17 to the surroundings thereof by means of the pin type fins 18. When the residual steam within the water storage tank 17 is cooled and condensed, the pressure within the same is decreased down to a level permitting the pool water within the fuel storage pool 3 to enter the water storage tank 17. Thus, that pool water enters the water storage tank 17 by way of the piping 16 and the check valve 15 and is stored in the same. After this storage, when the on-off valves 13, 14 are re-opened, the cooling water stored within the water storage tank 17 is filled into the pressure vessel 4 by the gravity in the same manner as mentioned above.

Through repetition of the above-mentioned operation, it is possible to supplement the coolant for a long period of time into the pressure vessel in a state wherein the level of the cooling water within the pressure vessel 4 decreases while the same is maintained in a condition of high pressure. This can avoid the danger of the reactor due to the loss-of-coolant accident for a long period of time. Thus, this embodiment avoids the occurrence of a danger due to the loss-of-coolant accident without using any dynamic equipment such as a pump, thus enhancing the reliability of the apparatus. This eliminates the necessity of considering the damages likely to be caused to a power source for driving a pump, or a control system for a pump.

In the first embodiment, the height of a pool water inlet 23 of the piping 16 is made higher than that of the used fuel within the fuel storage tank 3, thereby completely avoiding any impairment of the function of the fuel storage pool.

Figure 2:
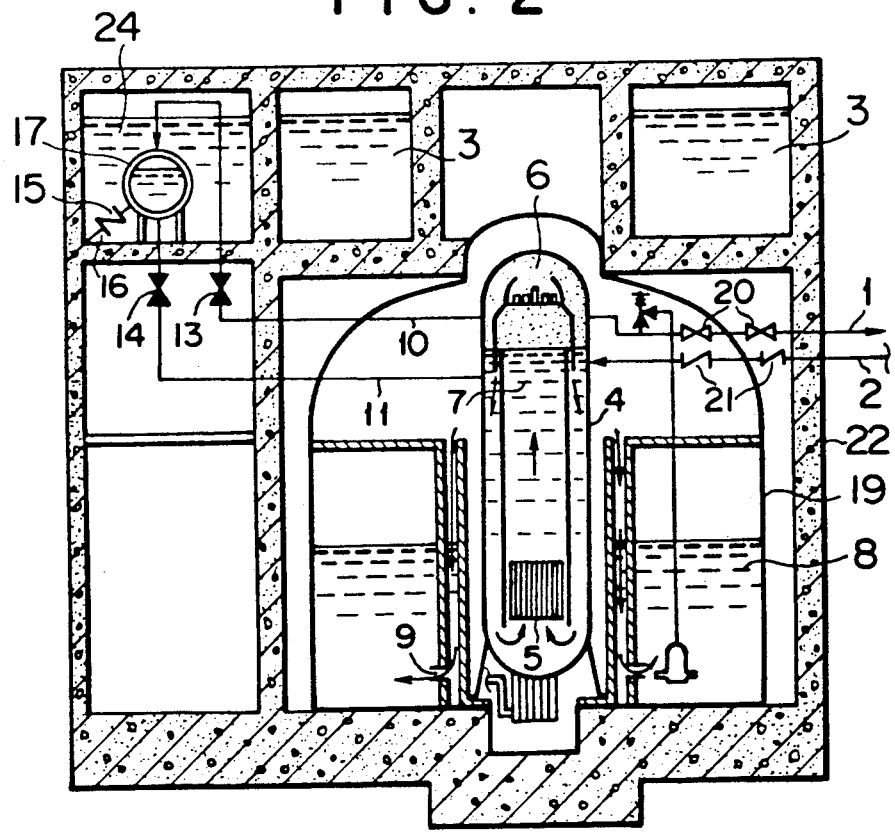
FIG. 2 is a vertical sectional view of a reactor in accordance with a second embodiment of the present invention.

The second embodiment shown in FIG. 2 is a modification of the first embodiment and differs from the latter as follows, provided that the same parts or sections as those in the first embodiment are denoted by like reference numerals and description thereof is omitted.

In FIG. 2, a pool 24 is newly provided at a left upper corner of a secondary reactor container 22 and a water storage tank 17 is installed within a water in the pool 24 in such a manner that the water storage tank 17 is submerged within the water of the pool 24. One end of a piping 16 connects to the interior of the water storage tank 17 via a check valve 15 while the other end thereof is opened as a suction port to a bottom portion of the pool 24. The other constructions are the same as those of the first embodiment.

According to the second embodiment shown in FIG. 2, the same function or action and effect are brought about. In addition, since the water storage tank 17 is submerged within the pool water of the pool 24, the pool water plays both the role of promoting the condensation of the steam within the water storage tank 17 and the role as the function of a supplementary cooling water supply source for supply of a supplementary cooling water into the water storage tank 17. Thus, the facilities are simplified and at the same time the pressure within the water storage tank 17 can be effectively reduced.

Figure 3:
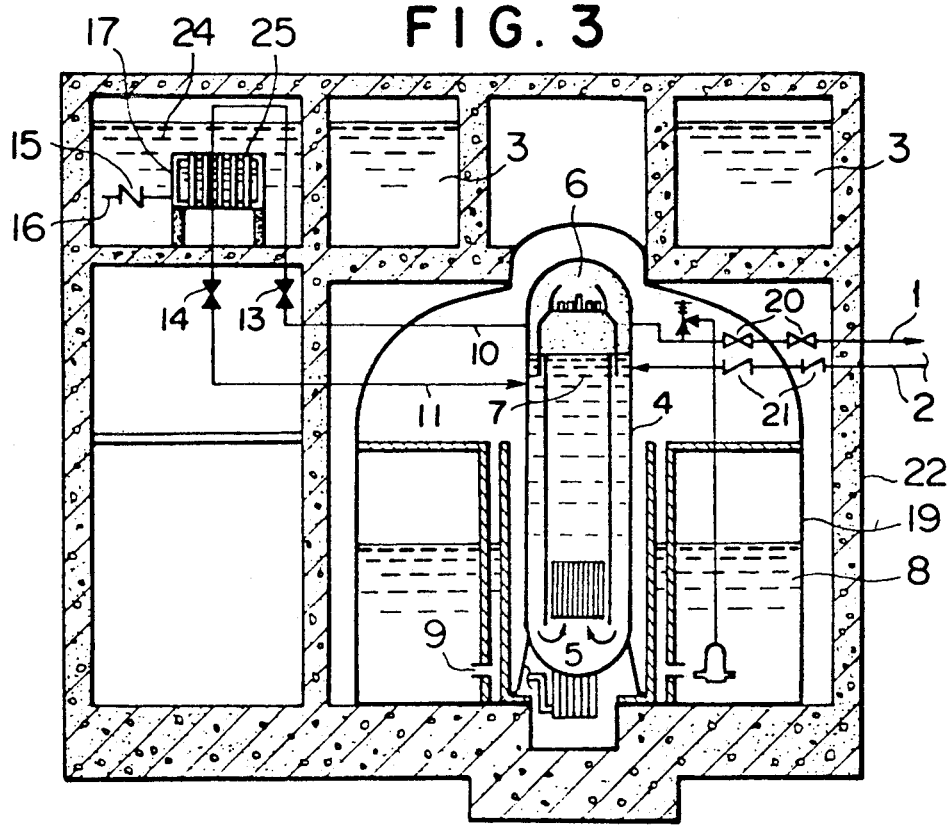
FIG. 3 is a vertical sectional view of a reactor in accordance with a third embodiment of the invention.

A third embodiment shown in FIG. 3 is a modification of the first embodiment. Both the embodiments differ from each other in the following respects, provided that the same parts or sections as those in the preceding embodiment are denoted by like reference numerals, respectively, and description thereof is omitted.

Referring to FIG. 3, a pool 24 is newly provided at a left upper corner of a secondary reactor container 22. A water storage tank 17 is installed within a pool water in this pool 24 in such a manner that the water storage tank 17 is submerged within the same. The arrangement includes a piping 16 having one end connecting to the interior of the water storage tank 17 via a check valve, the other end thereof being opened as a suction port to an inner bottom portion of the pool 24. A plurality of heat transfer pipes 25 are disposed in the water storage tank 17 in such a manner that they are passed through the water storage tank 17 in their vertical direction, and that their upper and lower ends are opened into the pool water of the pool 24. The other constructions are the same as in the first embodiment.

According to the third embodiment shown in FIG. 3, the same action and effect as in the case of the first embodiment are obtained. In addition, the water storage tank 17 is submerged within the pool water of the pool 24, the pool water plays both the role of promoting the condensation of the steam within the water storage tank 17 and the role as a supplementary cooling water supplying source for supply of a supplementary cooling water into a water storage tank 17. Thus, the facilities are simplified and at the same time the pressure in the water storage tank 17 can be effectively decreased. Further, at the time when the steam in the water storage tank 17 is condensed, the pool water of the pool 24 passes through the heat transfer pipes 25 in such a manner that the pool water circulates therethrough from below to above. Therefore, as compared with an arrangement wherein dissipation of heat is effected only from the outer peripheral surface of the water storage tank, the steam condensing efficiency becomes high and cooling water can be speedily re-stored because dissipation of heat is effected from the interior of the tank as well via the heat transfer pipes 25. This brings about an advantage of enabling the reduction in the cycle length of filling water into the pressure vessel.

Figure 4:
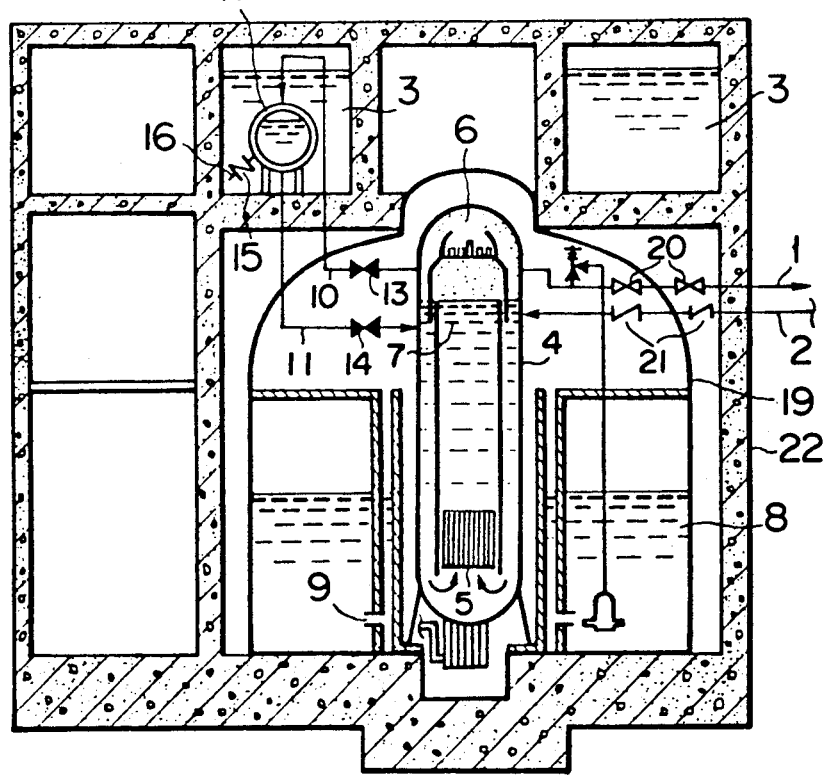
FIG. 4 is a vertical sectional view of a reactor in accordance with a fourth embodiment of the present invention.

A fourth embodiment shown in FIG. 4 is a modification of the first embodiment but differs from the latter in the following respects. Note that the same parts or sections as those in the first embodiment are denoted by like reference numerals and description thereof is omitted.

In FIG. 4, a water storage tank 17 is installed within the pool water within a fuel storage pool 3 in such a manner that the water storage tank 17 is submerged within the pool water. A piping 16 is so provided as to have one end connecting to the interior of the water storage tank 17 via a check valve 15 and the other end opened as a suction port into a bottom portion of the fuel storage pool 3. The other constructions are the same as those in the first embodiment.

According to the fourth embodiment shown in FIG. 4, the same action and effect as in the first embodiment can be obtained. Further, since the water storage tank is submerged within the pool water of the fuel storage pool 3, the pool water functions not only to promote the steam condensation within the water storage tank 17 but also to cool the stored fuel as well as to serve as a supplementary cooling water supplying source for supply of supplementary cooling water into the water storage tank 17. Thus, the simplification of the facilities and highly efficient pressure reduction for the water storage tank 17 can be achieved.

Figure 5:
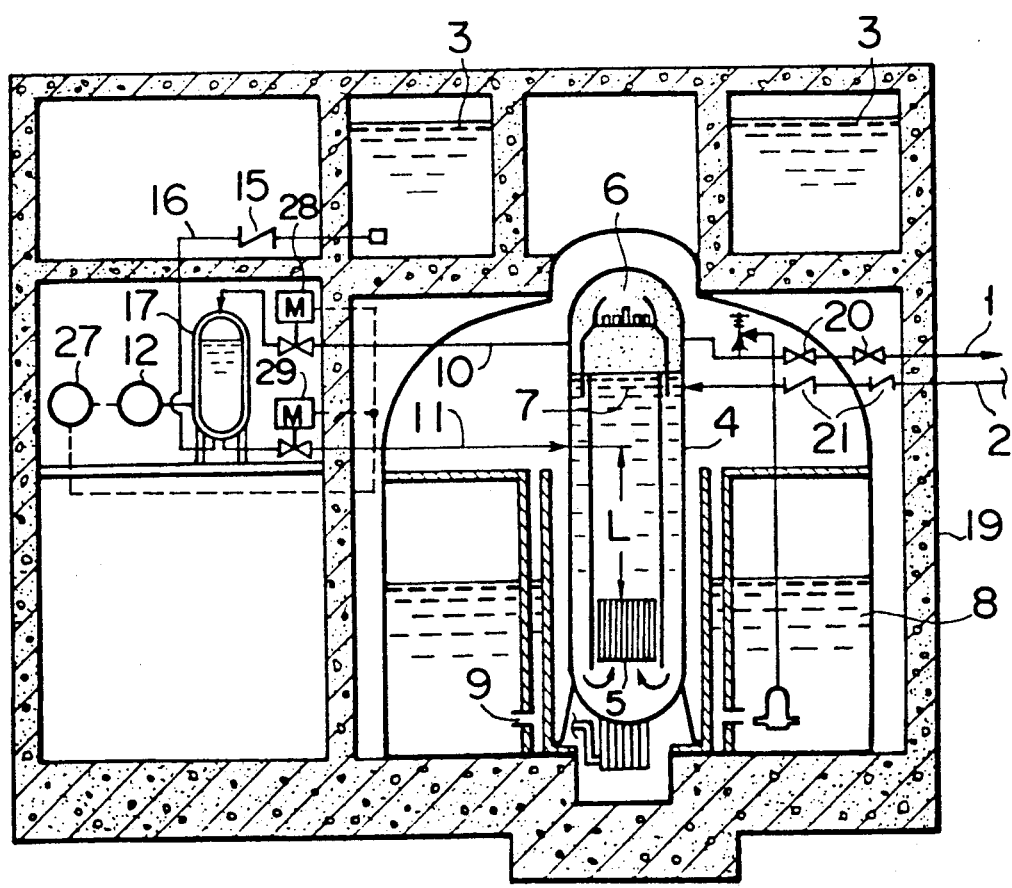
FIG. 5 is a vertical sectional view of a reactor in accordance with a fifth embodiment of the present invention.

A fifth embodiment shown in FIG. 5 is a modification of the first embodiment and the difference therebetween is as follows. In this embodiment, however, the same parts or sections as in the first embodiment are denoted by like reference numerals, respectively.

A valve 29 provided on a piping 11, the piping 11 having its filling port opened to the pressure vessel 4, the filling port being located at a position of liquid phase of the pressure vessel corresponding to a level equal to the height L as measured from the top of a reactor core 5, and a valve 28 provided on a piping 10 leading to a steam phase section 6 are motor operated valves. On the other hand, a water storage tank 17, which is disposed at a level higher than the level of said height L, has a level gage 12. A control device 27, which causes a switch to operate to close the valves 28, 29 in response to a low water level detection signal from the level gage 12 and which causes the valves 28, 29 to be opened in response to a high level of water detection signal, is connected between the level gage 12 and the motor operated valves 28, 29.

According to the fifth embodiment shown in FIG. 5, the same action and effect as in the first embodiment are brought about. In addition, when water is supplied from the water storage tank 17 to the pressure vessel 4 and when the level of water in the water storage tank 17 decreases, the level gage 12 delivers the low water level detection signal to the control device 27. As a result, the control device 27 so operates as to cause the valves 28, 29 to be closed. For this reason, the communication between the interior of the pressure vessel 4 and that of the water storage tank is rendered ineffective in respect of temperature as well as pressure. Thus, the water storage tank 17 is cooled by an ambient or surrounding atmosphere, whereby the steam within the water storage tank 17 is condensed. Thus, the pressure within the water storage tank 17 is lowered until the pool water within the fuel storage pool 3 is permitted to enter the water storage tank 17. And eventually, that pool water is introduced into the water storage tank 17. This causes an increase in the quantity of water pooled within the water storage tank 17, with the result that the level gage 12 detects a high level of water. Upon detection of this high level of water, the low level of water detection signal is extinguished. Then, the motor operated valves 28, 29 are opened. Thus, supply of water from the water storage tank 17 to the pressure vessel 4 is re-started. In this way, supply of water is effected for a long period of time.

This automatization can be also adopted in the preceding embodiments and further can be also applied as required to the following embodiments as well.

Figure 6:
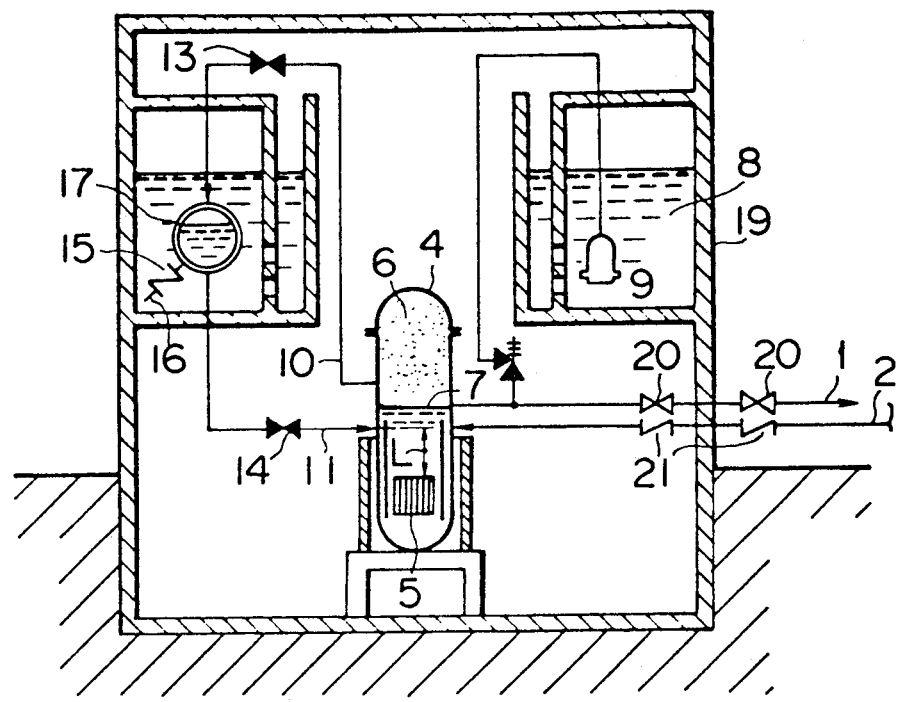
FIG. 6 is a vertical sectional view of a reactor in accordance with a sixth embodiment of the present invention.

A sixth embodiment shown in FIG. 6 is a modification of the first embodiment and differs from the first embodiment as follows, provided that the same parts or sections as those in the first embodiment are denoted by like reference numerals, respectively, and description thereof is omitted.

The embodiment includes a primary reactor container 19 in which suppression pools 8 are provided at upper portions thereof. A main steam piping 1, a water-feed piping 2, etc. are installed below the suppression pools. Within each suppression pool 8, a water storage tank 17 is installed in such a manner that the water storage tank 17 is submerged beneath the water of the pool 8.

The sixth embodiment of FIG. 6 is the same as the first embodiment in that if valves 13, 14 are opened, supply of water can be effected from the water storage tank 17 to the pressure vessel 4. After the water in the water storage tank has been exhausted after said supply of water, the valves 13, 14 are closed so as to permit the water storage tank 17 to be cooled by the pool water within the suppression pools 8. Thus, the residual high-temperature steam within the water storage tank 17 is condensed. Thus, the pressure within the water storage tank 17 decreases down to a level at which the pool water within the suppression pool 8 can be sucked into the tank 17. Thereafter, the water storage tank 17 sucks the pool water within the suppression pool 8 by way of a check valve, whereby the pool water is stored in the tank 17. If, thereafter, the valves 13, 14 are opened again, supply of water from the water storage tank 17 into the pressure vessel 4 is re-opened.

According to the sixth embodiment shown in FIG. 6, the suppression pools 8 are disposed at a level higher than the level of the height L as measured from a reactor core 5, and the pool water within the suppression pool 8 can be made a cooling water of the water storage tank 17 and also made a suction water into the same. Accordingly, there is no need to newly provide any pool. In addition, various devices or sections included in an emergency water filling system can be disposed within the primary reactor container 19, whereby it is possible to maintain the likelihood of radioactive leakage into the primary reactor container 19 of a conventional level.

Figure 7:
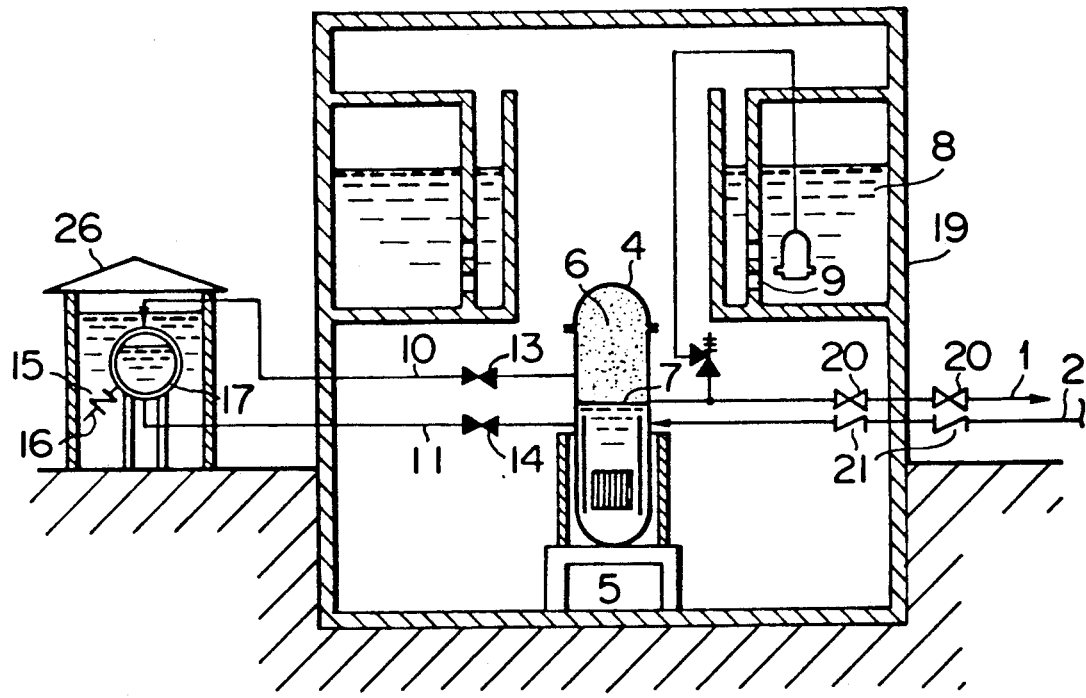
FIG. 7 is a vertical sectional view of a reactor in accordance with a seventh embodiment of the present invention.

A seventh embodiment shown in FIG. 7 differs from the sixth embodiment in that the position at which a water storage tank 17 is installed is different from that in case of the sixth embodiment. As shown in FIG. 7, the water storage tank 17 is disposed within a condensate storage tank 26 which is stationarily provided as a reactor facility outside a primary reactor container 19. Within this condensate storage tank 26 there is stored a condensate within which a water storage tank 17, a check valve 15, pipings, etc. are submerged.

According to the seventh embodiment, the condensate within which the condensate storage tank 26 can serve both as a liquid to be sucked into the water storage tank 17 and as a cooling water for cooling the water storage tank 17. This eliminates the necessity of newly installing a pool for submerging the water storage tank 17 within the water, or a pool for storing a liquid to be sucked into the water storage tank 17.

Figure 8:
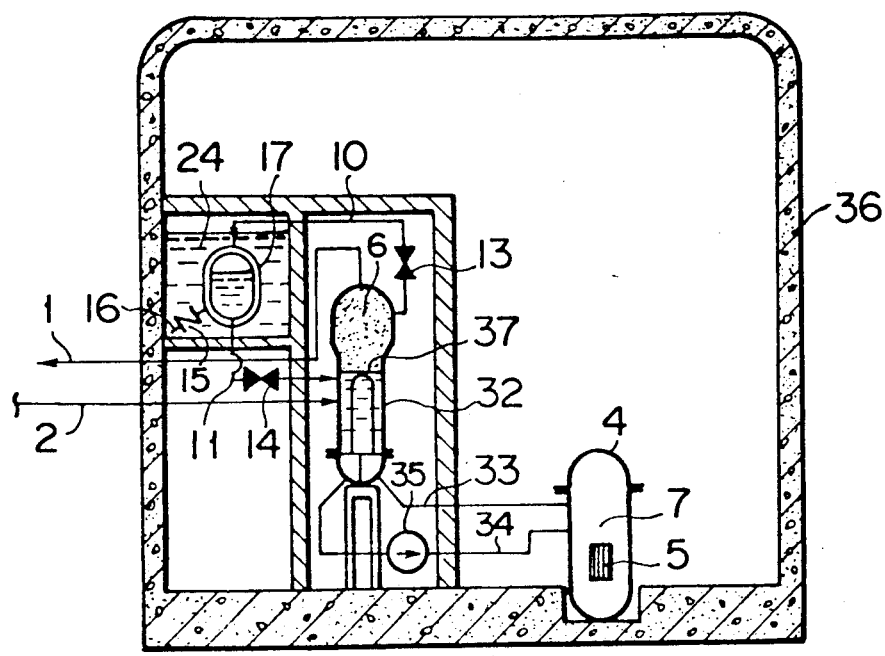
FIG. 8 is a vertical sectional view of a reactor in accordance with an eighth embodiment of the present invention.

An eighth embodiment of FIG. 8 refers to a pressurized water reactor containing therein a reactor core 5 generating heat by nuclear reaction and a cooling water 7 serving as a coolant. The pressurized water reactor includes a pressure vessel 4 which is received within a reactor container. The reactor container 36 further accommodates therein a pool 24, a water storage tank 17, and a steam generator 32. The pool 24 and water storage tank 17 are installed at a level higher than that corresponding to a liquid surface within the steam generator 32. Heat transfer pipes are disposed within the steam generator 32 and pipings 33, 34 are led to these heat transfer pipes. These pipings 33, 34 are connected to the pressure vessel 4. A pump 35 is provided at a midway of the piping 34. This pump sends a cooling water, which has been cooled down to a low temperature by a steam generator, to the interior of the pressure vessel 4, and sends a cooling water, which has been heated up to a high temperature by the reactor core 5, to the heat transfer pipes of the steam generator 32. Thus, within the steam generator 32 the water surrounding the heat transfer pipes are heated and thus are caused to evaporate to cause production of a high-temperature and high-pressure steam 6 at the top of the steam generator 32. A main steam piping 1 is connected to the steam generator 32 so that the high-temperature and high-pressure steam 6 produced in an upper phase section within the steam generator 32 can be sent to a turbine side. A water-feed piping 2 is so connected as to communicate with the cooling water 7 of the pressure vessel 4. This makes it possible to supply a condensate from, for example, a condenser to the steam generator 32. A gas phase section of the water storage tank 17 is allowed to communicate with a steam phase sction within the steam generator 32 by way of a piping 10. An on-off valve 13 is provided at a midway of the piping 10. A liquid phase section of the water storage tank 17 is allowed to communicate with a liquid phase section within the steam generator 32 by way of a piping 11, on which an on-off valve 14 is provided. The interior of the water storage tank 17 is allowed to communicate with the pool water within the pool 24 by way of a piping 16 equipped with a check valve 15 permitting water to flow only toward the interior of the water storage tank 17.

According to the eighth embodiment of FIG. 8, the reactor operation is performed with the valves 13, 14 being usually kept closed. During this reactor operation, the high-temperature and high-pressure steam is produced in the upper phase portion of the steam generator 32. This steam is sent to a turbine by way of the main steam piping 1 and is utilized as a drive source for the turbine. The steam, which has been utilized, becomes a condensate which is allowed to pass through the water feed piping and thus retuned back to the liquid phase portion of the steam generator. When the steam generator 32 or main steam piping 1 is broken or fractured whereby a loss-of-coolant accident occurs that a water is released from break openings into the reactor container 36 as it stands or after having become steam, the water within the steam generator 32 decreases with the result that the reactor core or steam generator comes into a danger that a loss of coolant over the reactor core occurs due to the steam generator.

Upon occurrence of the loss-of-coolant accident, the valves 13 and 14 are simultaneously opened, or firstly the valve 13 and secondly the valve 14 are opened, to permit communication between the interior of the steam generator 32 and the interior of the water storage tank 17. Thus, the high-temperature and high-pressure steam is introduced from the steam generator 32 into the water storage tank 17. Thus, the pressure within the steam generator 32 and that within the water storage tank 17 are equalized. Thus, the cooling water stored in the water storage tank 17 is introduced into the steam generator 32 by gravitational force and by way of the piping 11.

When the water stored in the water storage tank 17 becomes empty and yet is further required to be introduced, the valves 13 and 14 are closed to invalidate the effect of high temperature and high pressure in the steam generator 32 upon the water storage tank 17.

Thereafter, the water storage tank 17 is cooled by the pool water within the pool 24 to cause the heat within the water storage tank 17 to be dissipated over the environmental surroundings. When the residual steam within the water storage tank 17 is cooled and condensed, the pressure therewithin is decreased down to a level permitting the pool water within the pool 24 to be introduced into the water storage tank 17. At this time, the pool water enters the water storage tank 17 through the check valve 15 and thus is stored therein. When the valves 13 and 14 are opened after this storage, the water stored in the water storage tank 17 is introduced into the steam generator 32 by the action of the gravity by way of the piping 11, in the same manner as stated before.

Through repetition of the above-described operation, the danger of the reactor due to the loss of the coolant is avoided for a long period of time. In this way, the occurrence of a loss-of-coolant accident is avoided without adopting any dynamic equipment such as a pump, so that the reliability of the apparatus is enhanced.

Figure 9:
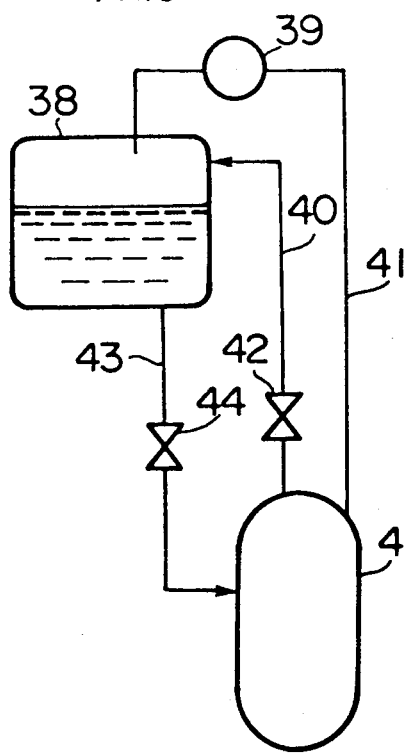
FIG. 9 is a systematic diagram of an emergency cooling water supplementing system of a conventional reactor.

FIG. 9 is a schematic diagram showing a reactor core cooling apparatus according to the prior art. When a loss-of-coolant accident has taken place, a valve 42 is opened to permit the steam having been generated within a reactor pressure vessel 4 to be led to a position above the water surface of a water storage tank 38 via a piping 40. Then, the pressure within the pressure vessel 4 is equalized with that within the water storage tank 38. Then, by opening a valve 44, the water stored in the water storage tank 38 can be introduced into the pressure vessel 4. The pressure difference between the pressure vessel 4 and the water storage tank 38 is monitored by means of a differential pressure gage 39. When the pressure difference has become sufficiently small, the valve 44 is opened, thereby causing the water stored within the water storage tank 38 to be introduced into the pressure vessel 4 by the gravitational force, thus completing the filling of the coolant into the pressure vessel 4.

The present invention brings about the following advantages. That is to say, a large amount of liquid exceeding the capacity of the closed water storage tank can be introduced into the high-temperature and high-pressure vessel without relying upon the use of any pressure feed means such as a pump or a dynamic equipment. In addition, repetition of supply of liquid into the high-temperature and high-pressure vessel can be automatically effected. This makes it easy to conduct the operation of filling liquid into the high-temperature and high-pressure vessel.

In addition, since it is not necessary to perform the operation of the valve between the liquid source and the closed liquid storage tank, the operation of filling the liquid into the high-temperature and high-pressure vessel becomes easy to carry out by that extent. Also, since the intermittent liquid filling cycle with respect to the high-temperature and high-pressure vessel can be expedited, it is possible to approximate it to a continuous liquid filling cycle. Further, since the pressure within the closed liquid storage tank can effectively be reduced, it is possible to provide a more suitable closed liquid storage tank for filling the liquid. In addition, at the time of a loss-of-coolant accident taking place in a reactor or steam generator, the safety therefrom can be secured for a long period of time without employing any pressure feed means such as a pump regarded as a dynamic equipment.

What is claimed is:

1. A liquid filling apparatus for a temperature and pressure vessel, comprising a temperature and pressure vessel, a liquid storage tank disposed at a level higher than that at which liquid is filled into said pressure vessel, a liquid-feed flow passage through which liquid is filled from said liquid storage tank into said pressure vessel, a pressure-feed flow passage through which pressure is supplied from said pressure vessel into said liquid storage tank, valves provided on said liquid-filling flow passage and said pressure-feed flow passage, respectively, and a liquid source for said filling of said liquid, means for communicating the interior of said liquid storage tank with said liquid source via a valve, and wherein said liquid storage tank is arranged such that the temperature surrounding the liquid storage tank is lower than the temperature in the interior of said pressure vessel, in which said valve for allowing said liquid source for said filling of said liquid to communicate with the interior of said liquid storage tank is a check valve for checking the flow of said liquid from said liquid storage tank toward said liquid source, and which further comprises a level gauge provided on said liquid storage tank and a valve-opening/valve-closing control means responsive to level detection signals from said level gauge for opening and closing the valves provided on said liquid filling and pressure-feed flow passage.

2. A liquid filling apparatus for a temperature and pressure vessel, comprising a temperature and pressure vessel, a liquid storage tank disposed at a level higher than that at which liquid is filled into said pressure vessel, a liquid-feed flow passage through which liquid is filled from said liquid storage tank into said pressure vessel, a pressure-feed flow passage through which pressure is supplied from said pressure vessel into said liquid storage tank, valves provided on said liquid-filling flow passage and said pressure-feed flow passage, respectively, and a liquid source for said filling of said liquid, means for communicating the interior of said liquid storage tank with said liquid source via a valve, and wherein said liquid storage tank is arranged such that the temperature surrounding the liquid storage tank is lower than the temperature in the interior of said pressure vessel, and wherein said liquid storage tank is arranged in the liquid of said liquid source.

3. A liquid filling apparatus according to claim 2, in which said temperature and pressure vessel is a steam generator.

4. An emergency cooling water supplementing system for a reactor according to claim 2, in which said temperature and pressure vessel is a reactor vessel.

5. An emergency cooling water supplementing system for a reactor according to claim 4, in which said liquid source is a pool water within a suppression pool of the reactor.

6. An emergency cooling water supplementing system for a reactor according to claim 4, in which said liquid source is a pool liquid with a fuel storage pool for the reactor.

7. An emergency cooling water supplementing system for a reactor according to claim 4, in which said liquid source is a condensate within a condensate storage tank for the reactor.

8. A liquid filling apparatus for a temperature and pressure vessel of a steam generator, comprising a temperature and pressure vessel of a steam generator, a liquid storage tank disposed at a level higher than that at which liquid is filled into said pressure vessel, a liquid-feed flow passage through which liquid is filled from said liquid storage tank into said pressure vessel, a pressure-feed flow passage through which pressurized steam in said pressure vessel is supplied from said pressure vessel into said liquid storage tank, valves provided on said liquid-filling flow passage and said pressure-feed flow passage, respectively, and a liquid source for said filling of said liquid, means for communicating the interior of said liquid storage tank with said liquid source via a valve, and wherein said liquid storage tank is arranged such that the temperature surrounding the liquid storage tank is lower than the temperature in the interior of said pressure vessel, and wherein said liquid storage tank comprises a heat radiation means for condensing steam in said liquid storage tank to enable reduction of the pressure within said liquid storage tank to a level which allows liquid from the liquid source to enter into the liquid storage tank.

9. A liquid filling apparatus for high-temperature and high-pressure vessel, comprising a temperature and pressure vessel, a liquid storage tank disposed at a level higher than that at which liquid is filled into said pressure vessel, a liquid-feed flow passage through which liquid is filled from said liquid storage tank into said pressure vessel, a pressure-feed flow passage through which pressure is supplied from said pressure vessel into said liquid storage tank, valves provided on said liquid-filling flow passage and said pressure-feed flow passage, respectively, and a liquid source for said filling of said liquid, means for communicating the interior of said liquid storage tank with said liquid source via a valve, and wherein said liquid storage tank is arranged such that the temperature surrounding the liquid storage tank is lower than the temperature in the interior of said pressure vessel, wherein said means for communicating directly connects the interior of the liquid storage tank with the liquid source via said valve and in which said valve for allowing said liquid source for said filing of said liquid to communicate with the interior of said liquid storage tank is a check valve for checking the flow of said liquid from said liquid storage tank toward said liquid source, in which said tank is arranged in the liquid of said liquid source.

10. A liquid filling apparatus for a temperature and pressure vessel according to claim 1, in which said liquid storage tank comprises a heat dissipation means for dissipating the heat outside the tank.

11. A liquid filling apparatus for a temperature and pressure vessel according to claim 1, in which said liquid storage tank is surrounded by liquid of said liquid source.

12. An emergency cooling water supplementing system for a steam generator according to claim 1, in which said temperature and high-pressure vessel is a steam generator.

13. An emergency cooling water supplementing system for a reactor according to claim 1, in which said temperature and high-pressure vessel is a reactor vessel.

14. An emergency cooling water supplementing system for a reactor according to claim 13, in which said liquid source is a pool water within a suppression pool of the reactor.

15. An emergency cooling water supplementing system according to claim 13, in which said liquid source is a pool liquid with a fuel storage pool for the reactor.

16. An emergency cooling water supplementing system for a reactor according to claim 13, in which said liquid source is a condensate within a condensate storage tank for the reactor.

17. A liquid filling apparatus for a temperature and pressure vessel, comprising a temperature and pressure vessel, a liquid storage tank disposed at a level higher than that at which liquid si filled into said pressure vessel, a liquid-feed flow passage through which liquid is filled from said liquid storage tank into said pressure vessel, a pressure-feed flow passage through which pressurized steam is said pressure vessel is supplied from said pressure vessel into said liquid storage tank, valves provided on said liquid-filling flow passage and said pressure-feed flow passage, respectively, and a liquid source for said filling of said liquid, mean for communicating the interior of said liquid storage tank with said liquid source via a valve, and wherein said liquid storage tank is arranged such that the temperature surrounding the liquid storage tank is lower than the temperature in the interior of said pressure vessel, and wherein said liquid storage tank comprises a heat radiation means for condensing steam in said liquid storage tank to enable reduction of the pressure within said liquid storage tank to a level which allows liquid from the liquid source to enter into the liquid storage tank, and in which said liquid storage tank is surrounded by liquid of said liquid source.

18. A liquid filling apparatus for a temperature and pressure vessel of a steam generator, comprising a temperature and pressure vessel of a steam generator, a liquid storage tank disposed at a level higher than that at which liquid is filled into said pressure vessel, a liquid-feed flow passage through which liquid is filled from said liquid storage tank into said pressure vessel, a pressure-feed flow passage through which pressure is supplied from said pressure vessel into said liquid storage tank, valves provided on said liquid-filling flow passage and said pressure-feed flow passage, respectively, and a liquid source for said filling of said liquid, means for communicating the interior of said liquid storage tank with said liquid source via a valve, and wherein said liquid storage tank is arranged such that the temperature surrounding the liquid storage tank is lower than the temperature in the interior of said pressure vessel, wherein said means for communicating directly connects the interior of the liquid storage tank with the liquid source via said valve and in which said valve for allowing said liquid source for said filling of said liquid to communicate with the interior of said liquid storage tank is a check valve for checking the flow of said liquid from said liquid storage tank toward said liquid source.

19. An emergency cooling water supplementing system for a reactor comprising a temperature and pressure vessel of a reactor, a liquid storage tank disposed at a level higher than that at which liquid is filled into said pressure vessel, a liquid-feed flow passage through which liquid is filled from said liquid storage tank into said pressure vessel, a pressure-feed flow passage through which pressure is supplied from said pressure vessel into said liquid storage tank, valves provided on said liquid-filling flow passage and said pressure-feed flow passage, respectively, and a liquid source for said filling of said liquid, means for communicating the interior of said liquid storage tank with said liquid source via a valve, and wherein said liquid storage tank is arranged such that the temperature surrounding the liquid storage tank is lower than the temperature in the interior of said pressure vessel, wherein said means for communicating directly connects the interior of the liquid storage tank with the liquid source via said valve and in which said valve for allowing said liquid source for said filling of said liquid to communicate with the interior of said liquid storage tank is a check valve for checking the flow of said liquid from said liquid storage tank toward said liquid source, and in which said liquid source is a pool liquid with a fuel storage pool for the reactor.

20. An emergency cooling water supplementing system for a reactor comprising a temperature and pressure vessel of a reactor, a liquid storage tank disposed at a level higher than that at which liquid is filled into said pressure vessel, a liquid-feed flow passage through which liquid is filled from said liquid storage tank into said pressure vessel, a pressure-feed flow passage through which pressurized steam is supplied from said pressure vessel into said liquid storage tank, valves provided on said liquid-filling flow passage and said pressure-feed flow passage, respectively, and a liquid source for said filling of said liquid, means for communicating the interior of said liquid storage tank with said liquid source via a valve, and wherein said liquid storage tank is arranged such that the temperature surrounding the liquid storage tank is lower than the temperature in the interior of said pressure vessel, and wherein said liquid storage tank comprises a heat radiation means for condensing steam in said liquid storage tank to enable reduction of the pressure within said liquid storage tank to a level which allows liquid from the liquid source to enter into the liquid storage tank, and in which said liquid source is a pool liquid with a fuel storage pool for the reactor.

* * * * *